United States Patent
Ismail (10) Patent No.: US 8,689,361 B1
(45) Date of Patent: Apr. 1, 2014

(54) METHOD OF MAKING THIN FILM PROBE TIP FOR ATOMIC FORCE MICROSCOPY

(71) Applicant: Salleh Ismail, El Monte, CA (US)

(72) Inventor: Salleh Ismail, El Monte, CA (US)

(73) Assignee: Oicmicro, LLC, Temple City, CA (US)

( * ) Notice: Subject to any disclaimer, the term of this patent is extended or adjusted under 35 U.S.C. 154(b) by 0 days.

(21) Appl. No.: 13/759,465

(22) Filed: Feb. 5, 2013

Related U.S. Application Data (60) Provisional application No. 61/719,652, filed on Oct. 29, 2012.

(51) Int. Cl.
  *G01Q 60/38* (2010.01)
  *G01Q 70/16* (2010.01)
  *G01Q 60/24* (2010.01)
  *G01Q 60/42* (2010.01)

(52) U.S. Cl.
  CPC ........... *G01Q 60/38* (2013.01); *G01Q 60/24* (2013.01); *G01Q 60/42* (2013.01); *G01Q 70/16* (2013.01); *Y10S 977/855* (2013.01); *Y10S 977/867* (2013.01); *Y10S 977/863* (2013.01)
  USPC .............. 850/40; 850/60; 850/62; 977/855; 977/867; 977/863

(58) Field of Classification Search
  CPC ........ G01Q 70/14; G01Q 70/16; G01Q 70/18
  USPC .......... 250/306, 307; 977/855, 857, 860, 863
  See application file for complete search history.

(56) References Cited

U.S. PATENT DOCUMENTS

| | | | |
|---|---|---|---|
| 5,066,358 A | 11/1991 | Quate et al. | |
| 5,221,415 A * | 6/1993 | Albrecht et al. | 216/2 |
| 5,580,827 A * | 12/1996 | Akamine | 216/2 |
| 5,856,672 A | 1/1999 | Ried | |
| 5,877,412 A | 3/1999 | Muramatsu et al. | |
| 6,156,215 A * | 12/2000 | Shimada et al. | 216/11 |
| 6,198,300 B1 | 3/2001 | Doezema et al. | |
| 6,408,122 B1 * | 6/2002 | Shimada et al. | 385/129 |
| 6,504,151 B1 | 1/2003 | Mitchell et al. | |
| 7,081,624 B2 | 7/2006 | Liu et al. | |
| 7,247,248 B2 | 7/2007 | Tee et al. | |
| 7,370,515 B2 | 5/2008 | Okulan et al. | |
| 7,823,216 B2 | 10/2010 | Fan et al. | |
| 8,056,402 B2 | 11/2011 | Hecker et al. | |
| 2006/0213289 A1 * | 9/2006 | Kjoller et al. | 73/866.5 |
| 2009/0241233 A1 * | 9/2009 | Sulzbach et al. | 850/40 |
| 2010/0235954 A1 * | 9/2010 | Henning et al. | 850/5 |
| 2012/0036602 A1 | 2/2012 | Lee | |
| 2012/0060244 A1 | 3/2012 | Poddar et al. | |
| 2012/0192319 A1 * | 7/2012 | Li et al. | 850/41 |

\* cited by examiner

*Primary Examiner* — Michael Logie
*Assistant Examiner* — James Choi
(74) *Attorney, Agent, or Firm* — Shimdkaji & Associates, P.C.

(57) ABSTRACT

A probe for atomic force microscopy may be provided by depositing a thin film onto a wafer substrate and etching the substrate to leave the thin film behind in the form of a handle, a cantilever, and a probe tip in the cantilever. In some embodiments, a thin film substrate for the probe may be accomplished by forming the probe mold on a first wafer, bonding a second wafer onto the first wafer, and patterning out the second wafer to define the substrate for the probe on the first wafer. The thin film may be deposited onto the exposed portions of the first wafer. Thereafter, portions of the first and second wafers may be removed to leave behind the probe.

6 Claims, 10 Drawing Sheets

METHOD OF MAKING THIN FILM PROBE TIP FOR ATOMIC FORCE MICROSCOPY

CROSS-REFERENCE TO RELATED APPLICATIONS

This application claims the benefit of priority under 35 U.S.C. §119(e) of U.S. Provisional Application having Ser. No. 61719652 filed Oct. 29, 2012, which is hereby incorporated by reference herein in its entirety.

BACKGROUND OF THE INVENTION

The present invention generally relates to laboratory equipment and, more specifically, to a thin film probe tip for atomic force microscopy.

Probes for micro-fabrication applications typically employ a silicon crystal based tip suitable for use in semiconductor integrated circuit topology applications. The size of silicon crystal based tips may make them to large for many probe applications reducing the breadth of their usefulness. Silicon crystal based tips are typically formed by machining a silicon substrate to form a cantilever (which can be several microns thick) with a solid conical silicon projection left as a probe tip. The integrity of the cantilever may be vulnerable to vibrations or breakage.

As can be seen, there is a need to provide a probe with a thinner but rigid profile that can be used with a variety of applications.

SUMMARY OF THE INVENTION

In one aspect of the present invention, a method of producing a thin film probe for atomic force microscopy comprises etching a probe tip mold into a first wafer; bonding a second wafer over the first wafer while concealing the probe tip mold; etching away a portion of the second wafer exposing the probe tip mold; depositing a layer of thin film onto the second wafer and into the exposed probe tip mold, the thin film forming a substrate defining the probe to include a handle, a cantilever extending from the handle, and a probe tip; removing the first wafer; removing the thin film layer in a pattern leaving the substrate defining the probe intact; and removing the substrate defining the probe from a remainder of the second wafer.

In another aspect of the present invention, a probe comprises a thin film formed into: a handle, a cantilever extending from the handle, and a pyramid shaped probe tip depressed from the cantilever.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, an embodiment of the present invention generally provides a thin film probe useful for example, in atomic force microscopy. In an exemplary embodiment, the thin film probe and methods for manufacturing the thin film probe may provide a sharp inverted pyramid shaped probe tip. In some embodiments, two wafers may be bonded to form an interface that may have an improved structural integrity for a cantilever substrate over conventional probe cantilever structures. In some embodiments, the probe tip may be positioned against the cantilever's edge providing improved sighting of the probe tip during use.

In the following, use of notations with the format <###> refer to lattice planes, as may be known for example in the Miller index of notation.

Figure 1:
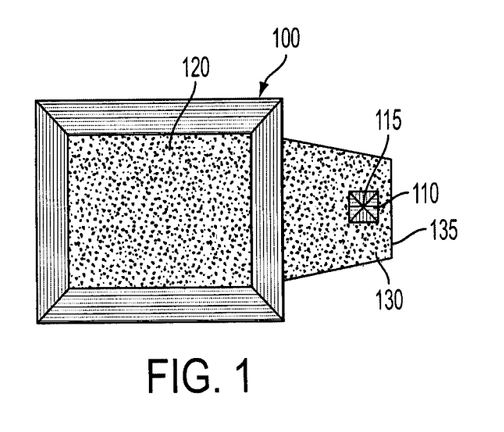
FIG. 1 is a top view of a thin film probe in accordance with an exemplary embodiment of the present invention.
Figure 2A:
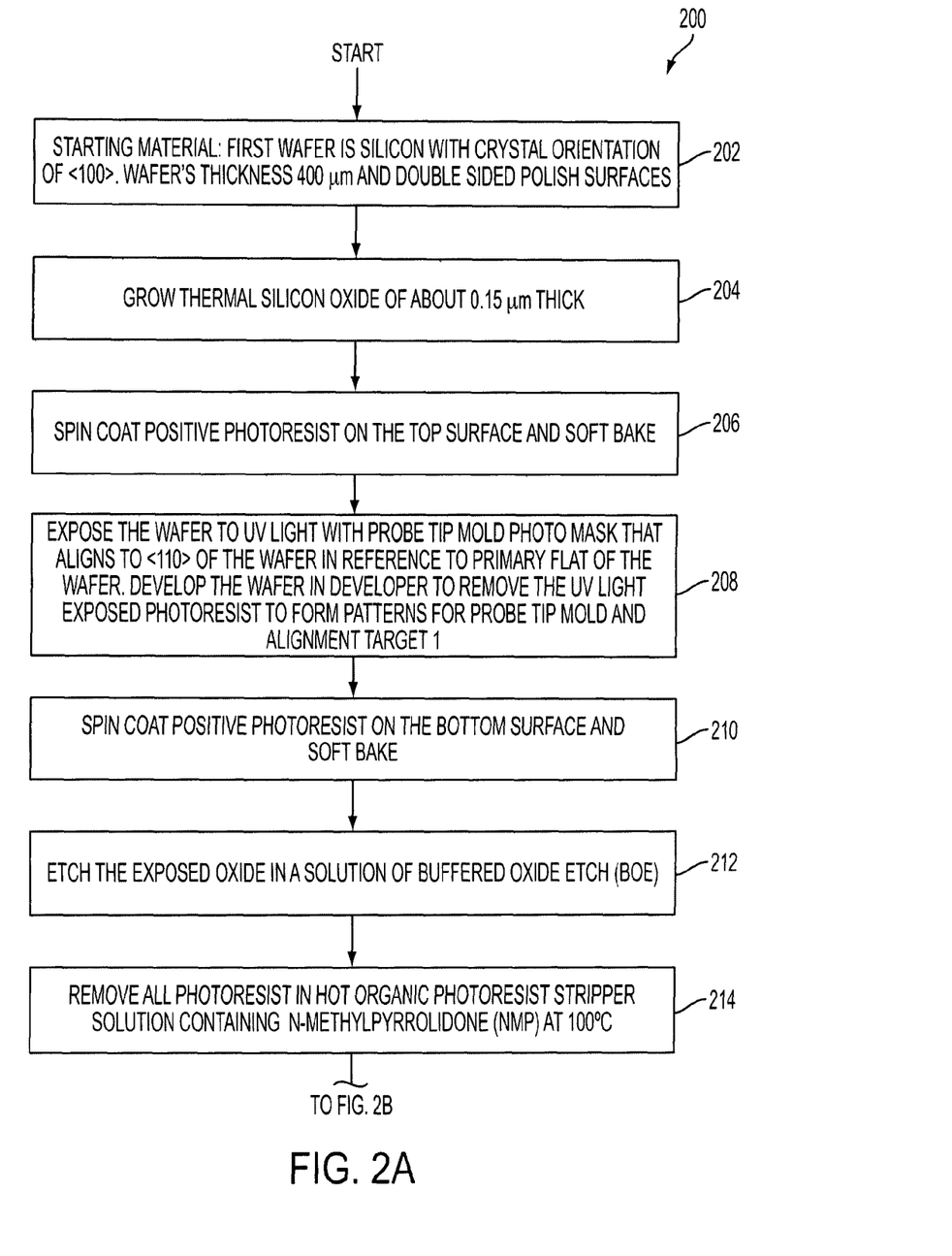
FIGS. 2A-2E are a flowchart of a method for producing the thin film probe of FIG. 1 in accordance with another exemplary embodiment of the present invention.
Figure 2B:
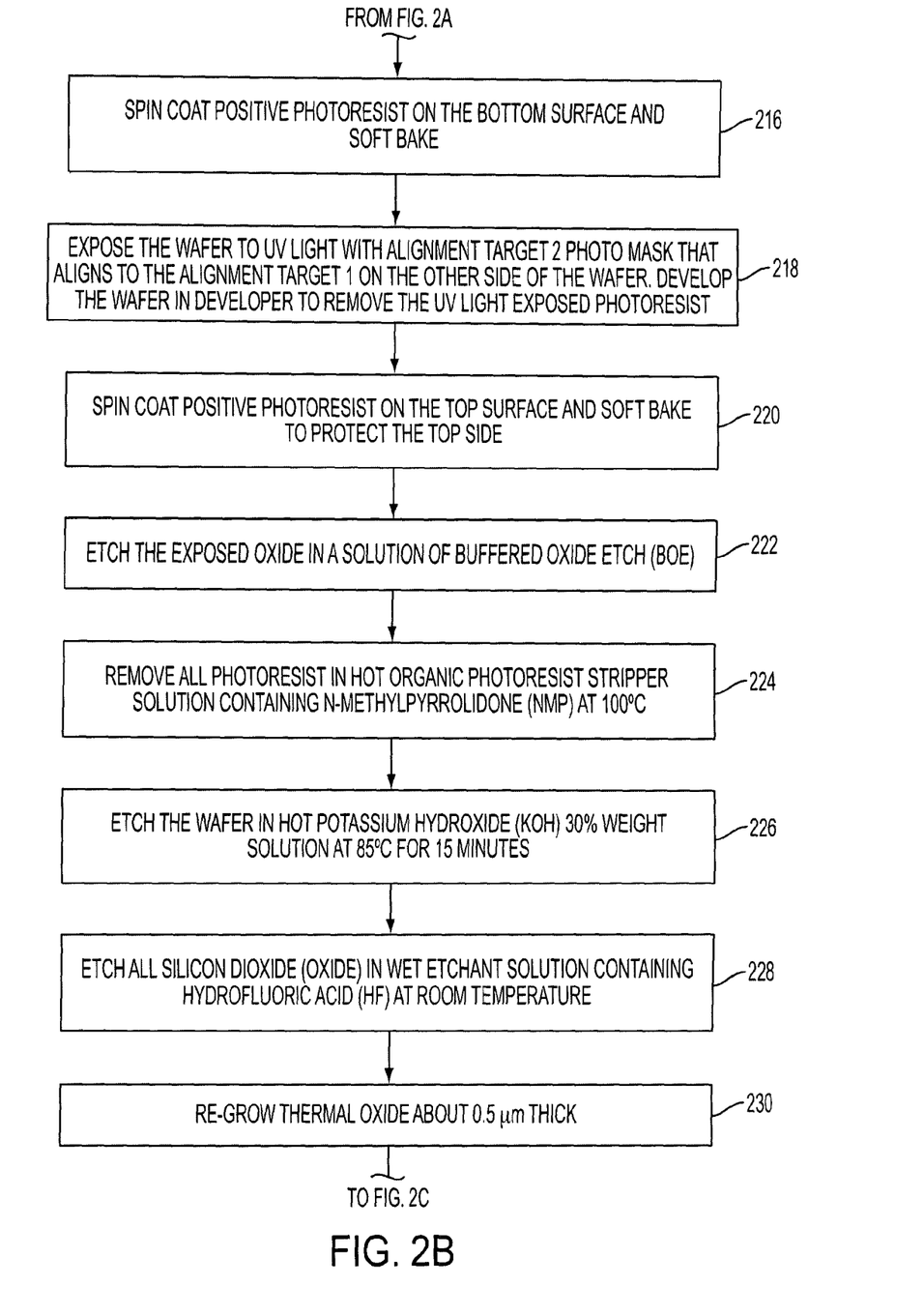
Figure 2C:
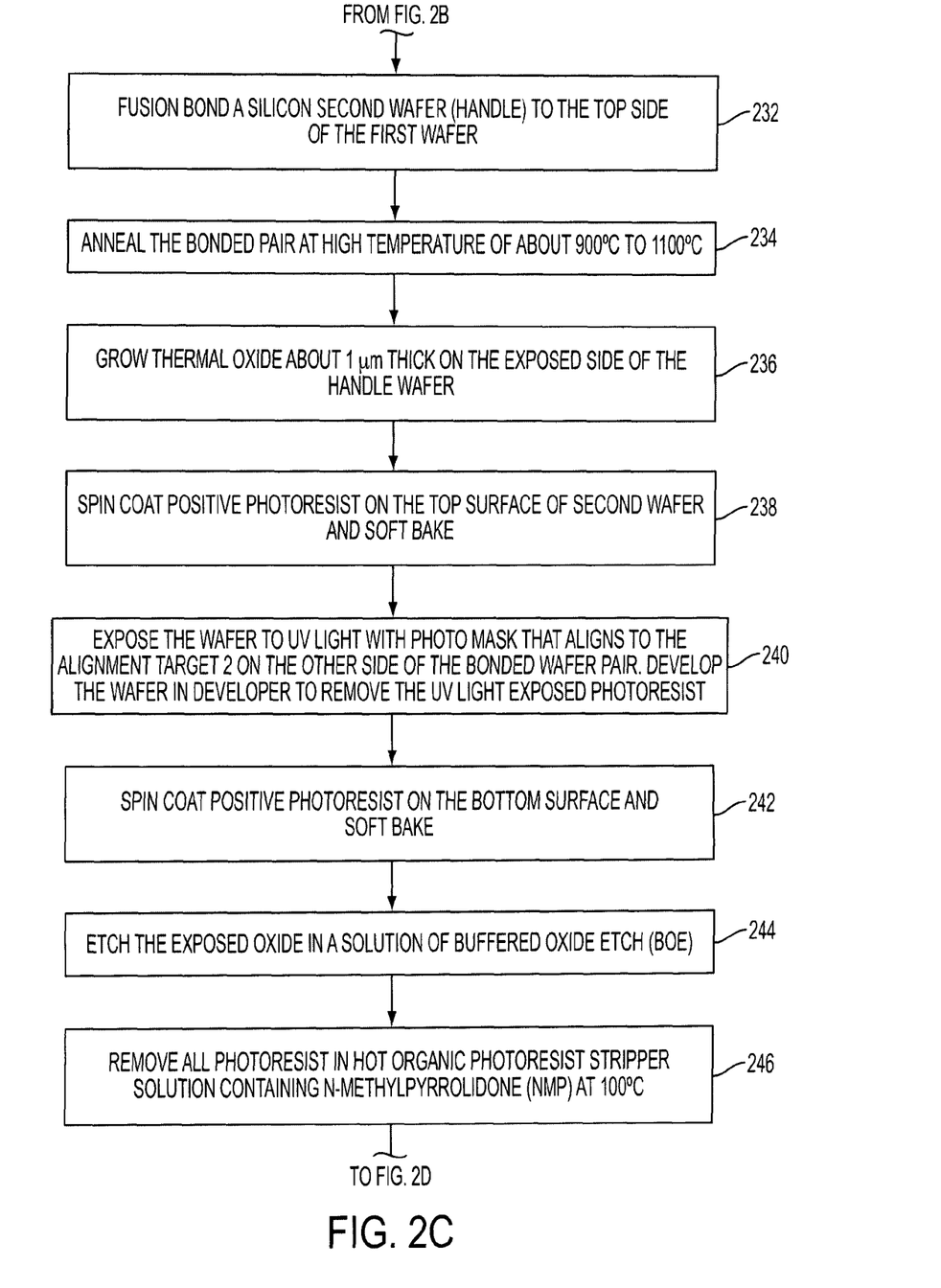
Figure 2D:
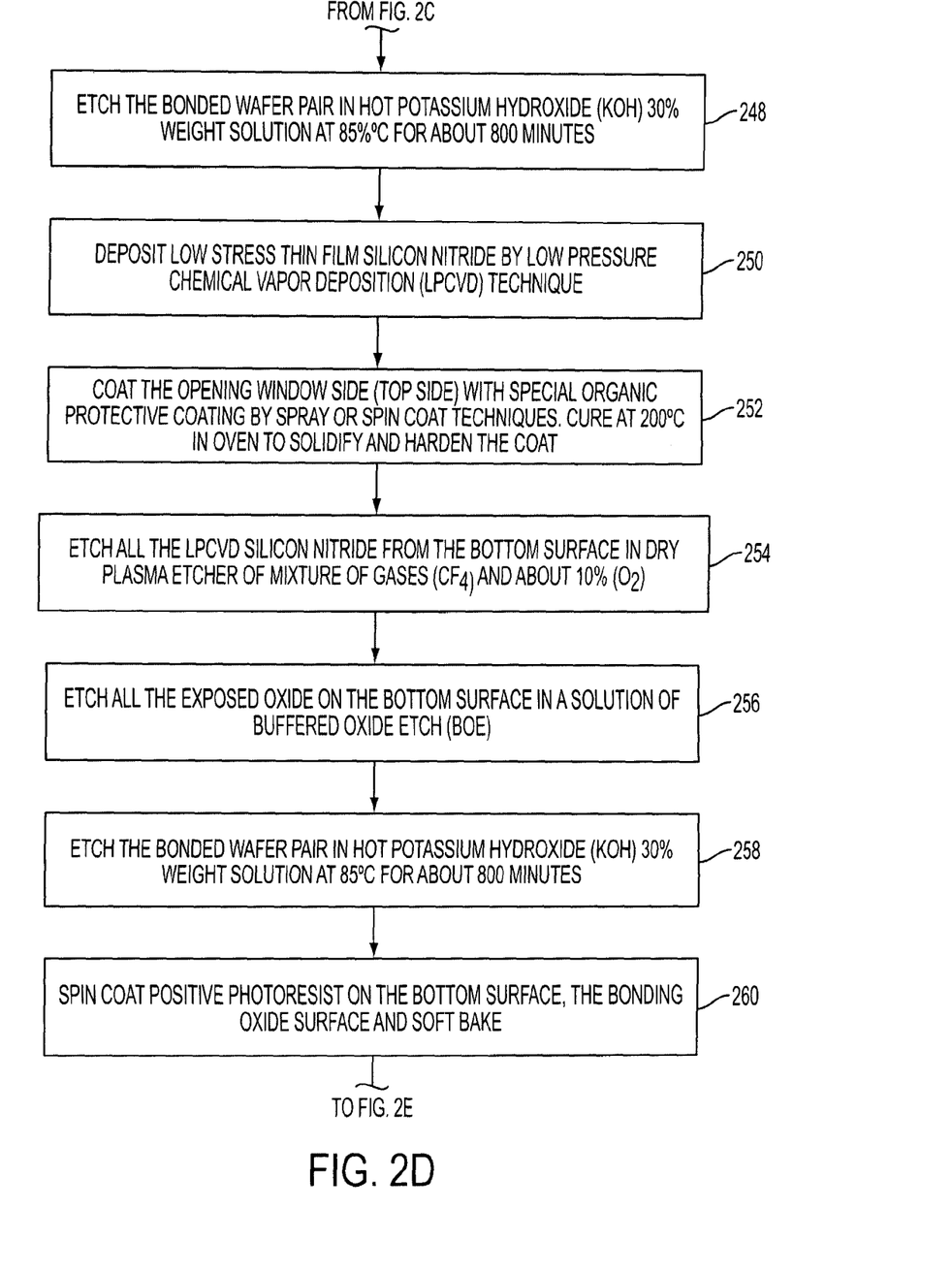
Figure 2E:
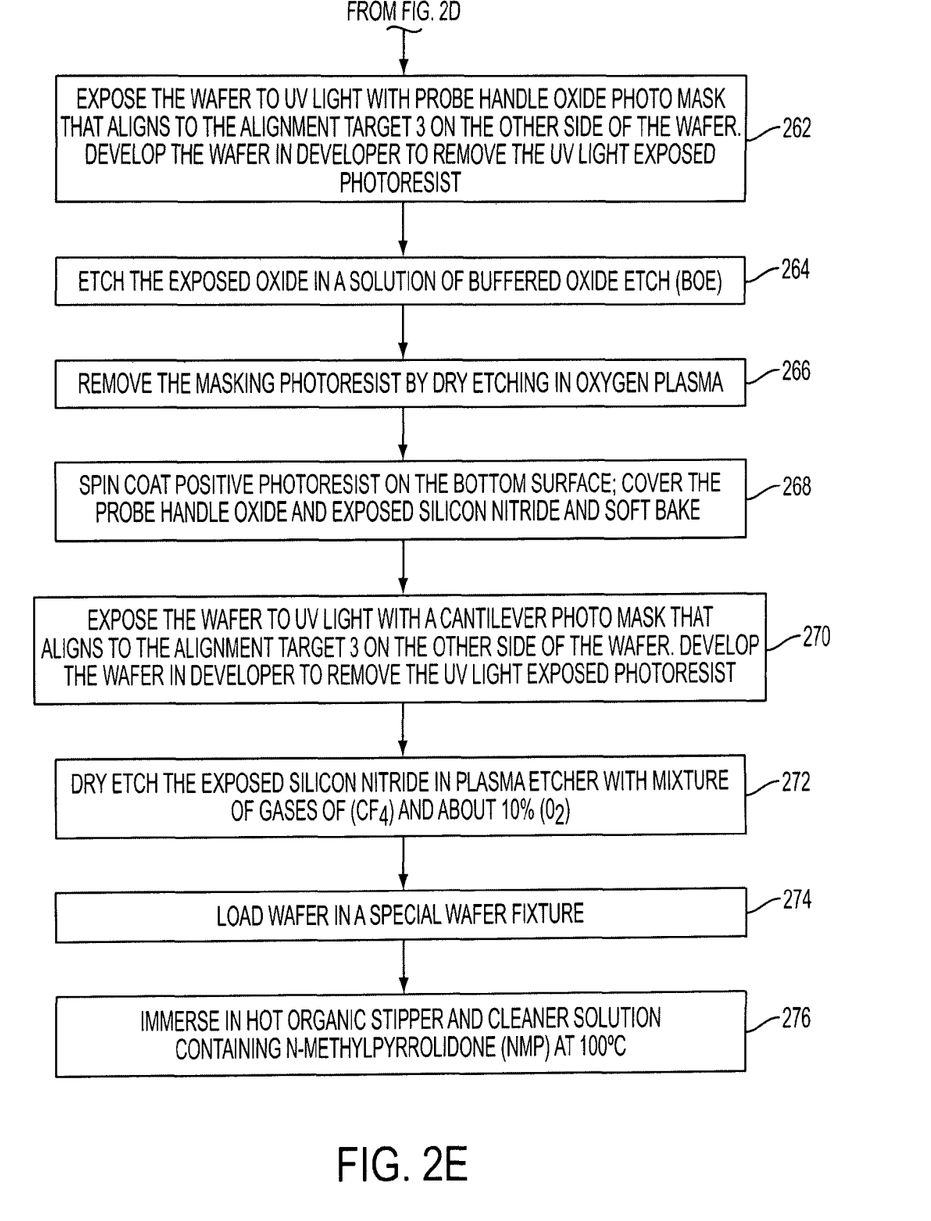

Referring now to FIG. 1, a thin film probe 100 is shown according to an exemplary embodiment of the present invention. The thin film probe 100 may include a probe tip 110, a handle 120 and a cantilever 130 bridging the handle 120 to the probe tip 110. The probe tip 110 and the cantilever 130 may be a uni-body, thin film extending from the handle 120. For example, the probe tip 110 may be part of the same thin film substrate as the cantilever 130. In an exemplary embodiment, the thickness of the thin film substrate defining the probe tip 110 and the cantilever 130 may be in a range of 0.2 um to 1.0 um. The probe tip 110 may be formed as a hollow depression, for example, as an inverted pyramid with a nadir 115 below the plane of the cantilever 130.

FIGS. 2A-2E show a series of steps in a method 200 of manufacturing the thin film probe 100 according to an exemplary embodiment of the present invention. In the following subject disclosure, the steps of FIGS. 2A-2E will be described with concurrent reference to FIGS. 3-12, which show various stages of forming the thin film probe 100.

Figure 3:
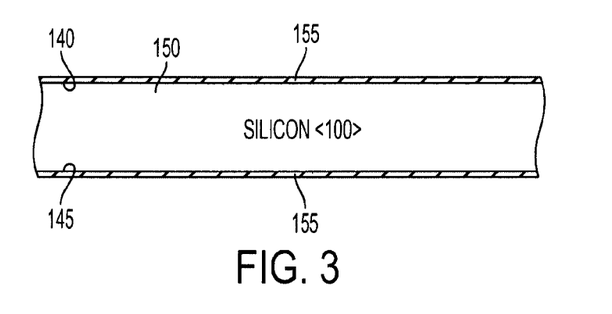
FIG. 3 is a cross-sectional side view of a wafer prepared for the thin film probe tip of FIG. 1.

Referring to FIG. 3, the method 200 of producing the thin film probe 100 may include in step 202 using a first wafer 150 that may be for example, a single crystal silicon wafer with a crystal orientation of <100>. In an exemplary embodiment, the wafer 150 may have a double-sided polish. The thickness of the wafer 150 may be approximately 400 um with a typical resistivity of about 10 Ohm-cm.

In step 204, a thermal oxide layer 155, for example, a layer of silicon dioxide, may be grown as a masking layer over at least one surface (for example, a top surface 140) of the wafer 150 for wet anisotropic etching using for example, KOH (Potassium Hydroxide). The thermal oxide layer 155 may be approximately 0.15 um thick. In an exemplary embodiment, the thermal oxide layer 155 may be grown by exposing the wafer 150 to an oxygen environment in a high temperature furnace. The temperature range of exposure may be, for example, in a range of approximately 900° C. to 1100° C. In some embodiments, the thermal oxide layer 155 may be grown on both the top surface 140 and a bottom surface 145.

Figure 4:
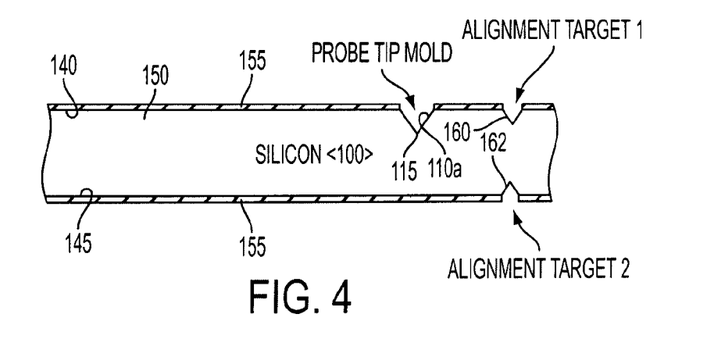
FIG. 4 is a cross-sectional side view of the wafer of FIG. 3 with a probe tip mold and alignment targets etched into the wafer.

Referring now to FIG. 4, step 206 may include spin coating a photoresist (not shown) on to the wafer 150. In an exemplary embodiment, the photoresist is a positive type. For sake of illustration, the following is described with respect primarily to the top surface 140 however it will be understood that either surface that includes the thermal oxide layer 155 may be applied with the photoresist. The photoresist may be soft baked onto the thermal oxide layer 155.

In step 208, the photoresist may be subjected to photolithography where a mask (not shown) is disposed over the top side of the wafer 150. The mask may include a probe tip mold pattern which may be a square opening where two parallel sides may be aligned to a <110> crystal plane direction with respect to the primary flat of the wafer 150. The wafer 150 may be exposed to ultraviolet light. A developer may be applied to the wafer 150 to remove the exposed photoresist. The resultant pattern may include the probe tip mold 110a opening and in some embodiments, an alignment target 160 opening positioned adjacent the probe tip mold 110a on the top surface 140.

In step 210, the bottom side of the wafer 150 may be spin coated with the positive photoresist and soft baked. This layer of photoresist may protect the bottom surface 145 during subsequent steps.

In step 212, the exposed portions of the layer of thermal oxide 155 on the top surface may be etched. For example, a solution of buffered oxide etch (BOE) may be used. The BOE may include a mixture of ammonium fluoride ($NH_4F$) and hydrofluoric acid. The etched portions of the thermal oxide layer 155 may expose the underlying wafer portions aligned to the square opening of the probe tip mold 110a and the opening for the alignment target 160.

In step 214, the photoresist may be removed from both the top surface 140 and bottom surface 145. A hot organic photoresist stripper may be used containing a solution of N-Methlypyrrolidone (NMP) at 100° C. The result of stripping away the photoresist may provide a thermal oxide pattern for the probe tip mold 110a and the alignment target 160.

In step 216, the photoresist may be re-applied to the bottom surface 145 of the wafer 150 by spin coating the photoresist and soft baking it.

In step 218, a mask (not shown) may be applied to the bottom surface 145 over the photoresist. Photolithography may be used to form a second alignment target 162 on the bottom side of the wafer 150 that is aligned with the first alignment target 160. The mask may provide an exposed alignment target 162 pattern in the photoresist aligned directly below the alignment target 160. The wafer 150 may be subjected to the developer to remove the photoresist from the exposed alignment target 162 pattern.

In step 220, the positive photoresist may be spin coated onto the top surface 140. This layer of photoresist may protect the top side of the wafer 150 during the next step.

In step 222, the exposed portions of the thermal oxide layer 155 on the bottom surface 145 may be etched using the solution of BOE.

In step 224, the photoresist may be removed from both the top surface 140 and bottom surface 145. A hot organic photoresist stripper may be used containing a solution of N-Methlypyrrolidone (NMP) at 100° C. The result of stripping away the photoresist may provide the exposed thermal oxide layer 155 on the bottom surface 145 in the pattern of the alignment target 162.

Figure 5:
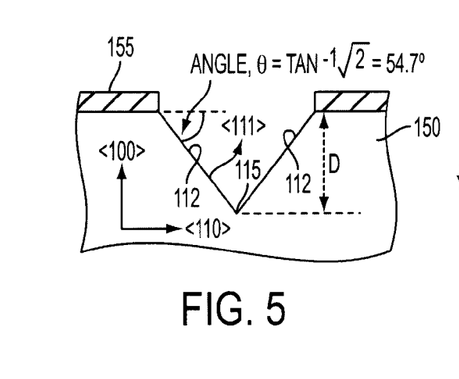
FIG. 5 is an enlarged partial side view of the probe tip mold of FIG. 4.
Figure 6:
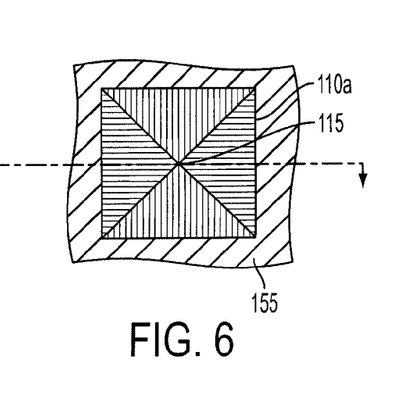
FIG. 6 is an enlarged partial top view of the probe tip mold of FIG. 4.

Referring now to FIGS. 4-6, in step 226 the exposed portions of the thermal oxide layer 155 may be anisotropically etched in a hot solution of 30% weight KOH at 85° C. In an exemplary embodiment, the etching may be applied until an inverted pyramid shape for the probe tip mold 110a is achieved. This etched pyramid shape may be due to differential etching between the crystal plane <100> to crystal plane <111>. According to an exemplary embodiment of the etching process, the etch rate of the wafer crystal plane <100> may be more than 400× that of the crystal plane <111> forming for example, sloped sidewalls 112 that may converge at a nadir 115. The etch depth, D of the inverted pyramid pit formed by the anisotropic etch may be between 5 um to 10 um where etch selectivity of the silicon in the wafer crystal plane <100> to the oxide is about 600. A similar etching approach to forming the probe tip mold 110a may also be used to produce the etched out portions of the wafer 150 for the alignment targets 160; 162.

In step 228, the thermal oxide layer(s) 155 may be removed by using wet chemical etching. A solution containing for example Hydrofluoric Acid (HF) at room temperature may be used to perform the chemical etching.

Figure 7:
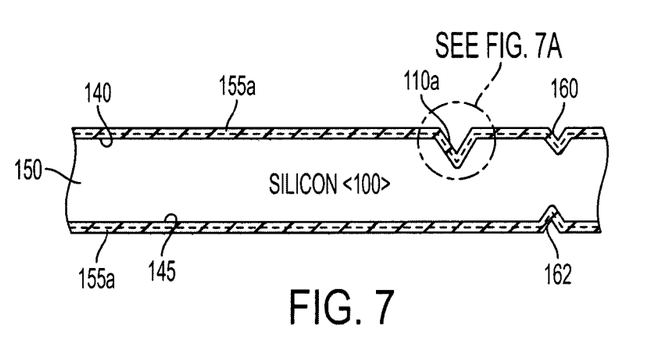
FIG. 7 is a cross-sectional side view of the wafer of FIG. 4 with a layer of thermal oxide filling the probe tip mold.
Figure 7A:
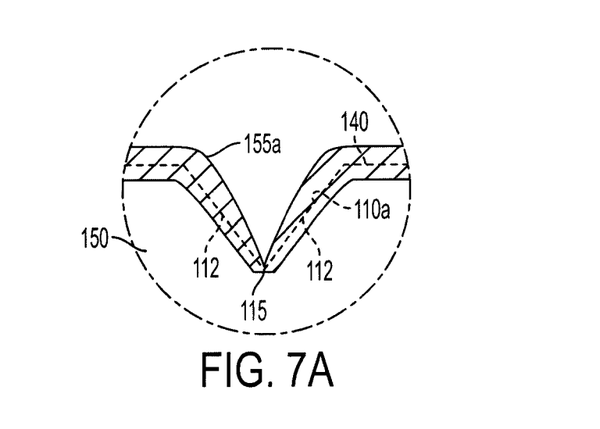
FIG. 7A is an enlarged side view of the circle 7A of FIG. 7.

Referring now to FIGS. 7 and 7A, a thermal oxide layer 155a may be re-grown onto the wafer 150. The thermal oxide layer 155a may be grown on at least the top surface 140. In some embodiments, the thermal oxide layer 155a may also be grown onto the bottom surface 145. The thermal oxide layer 155a may be grown to a thickness of approximately 0.5 um. In an exemplary embodiment, the thermal oxide layer 155a may be grown into the probe tip mold 110a along the sidewalls 112. The slope of the thermal oxide layer 155a from the top surface 140 down along the sidewalls 112 to the nadir 115 may be controlled to provide a desired sharpness for the resultant probe tip 110. For example, the thermal oxide layer 155a may be grown so that a hollow area is formed between the sidewalls 112. The slope of the sidewalls 112 may be configured to form an acute angle at the nadir 115.

Figure 8:
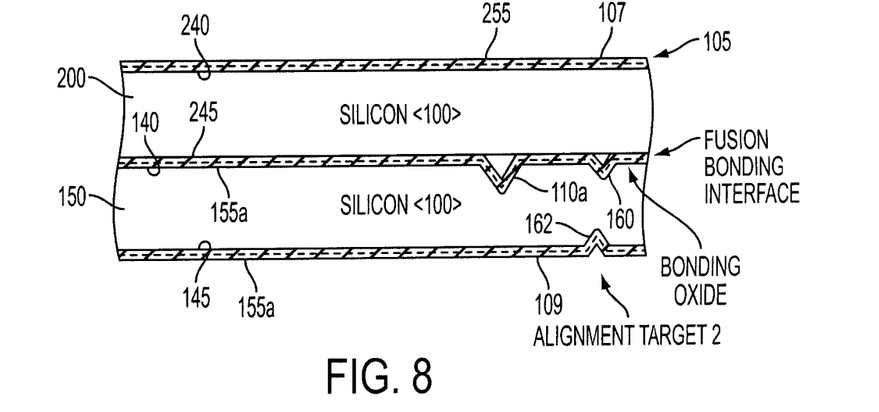
FIG. 8 is a cross-sectional side view of the wafer of FIG. 7 with a second wafer bonded over the probe tip mold.

Referring now to FIG. 8, in step 232 a second wafer 200 may be bonded to the top surface 140 of the wafer 150 concealing the probe tip mold 110a and forming a bonded wafer pair 105. Surfaces facing outward from the wafer 200 may be considered a top side 107 of the wafer pair 105. Surfaces facing outward from the wafer 150 may be considered a bottom side 109 of the wafer pair. The wafer 200 may be similar to the wafer 150. For example, the wafer 200 may be a single crystal silicon wafer with a crystal plane orientation of <100>. The wafer 200 may have a double-sided polish. The thickness of the wafer 200 may be approximately 400 um with a typical resistivity of about 10 Ohm-cm. The wafer 200 may be aligned in the same crystal plane orientation to the wafer 150.

The wafer 150 may be bonded to the wafer 200 by fusion bonding. Through fusion bonding the two wafers 150 and 200 (e.g. silicon wafers), a direct bonding may be established. For example, hydrogen bonds may be formed when the extremely clean and smooth silicon bottom surface 245 of the wafer 200 is brought into intimate contact with the thermal oxide layer 155a (silicon dioxide) on the top surface 140 at room temperature.

In step 234, the direct bonded wafer pair 105 may be annealed at high temperature in ambient oxygen. The temperature range for annealing may be between 900° C. to 1100° C. During annealing, the bonds may then transform into natural covalent bonds.

In step 236, a thermal oxide layer 255 may be grown on the top surface 240 of the wafer 200. The thermal oxide layer 255 may be grown to approximately 1 um in thickness.

In step 238, a photoresist may be spin coated onto the top surface 240 over the thermal oxide layer 255.

Figure 9:
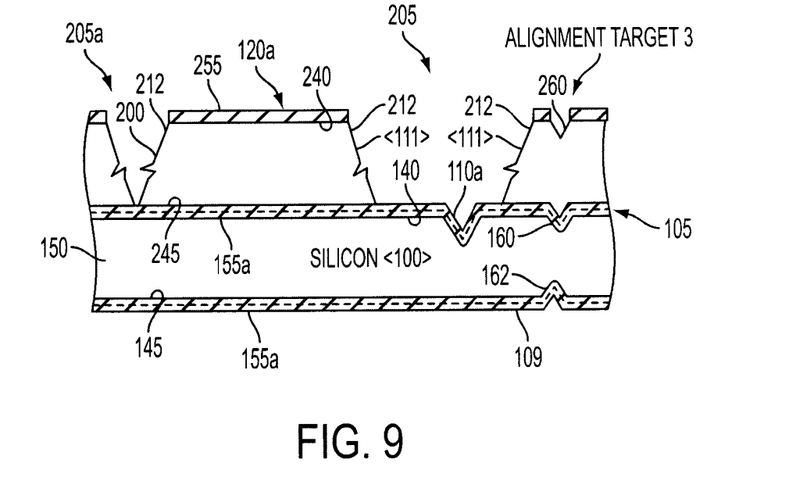
FIG. 9 is a cross-sectional side view of the bonded wafers of FIG. 8 with the second wafer etched to form a probe handle support frame.
Figure 10:
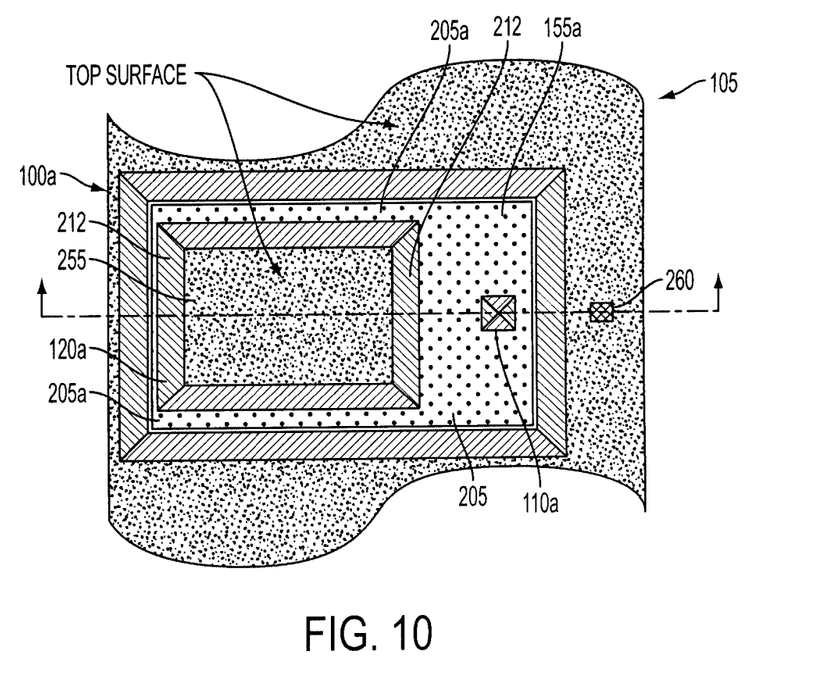
FIG. 10 is an enlarged partial top view of the bonded wafers showing a single thin film probe pattern.

Referring now to FIGS. 9 and 10, in step 240 the wafer 200 may be subjected to photolithography to provide patterns for etching on the top surface 240. For sake of illustration, FIG. 10 shows only a single probe tip pattern 100a on a bonded wafer pair however it will be understood that several probe tip patterns may 100a be present. A mask may be applied over the thermal oxide layer 255 providing a pattern opening 205 for exposing the underlying thermal oxide layer 255 over the probe tip mold 110a. A pattern opening 205a may also be provided defining the perimeter of the wafer 200 that will become the handle 120.

In some embodiments, the mask may also provide an opening pattern for a third alignment target 260. The third alignment target 260 may be in linear alignment with the alignment targets 160 and 162. It may be appreciated that the alignment target 260 provides a reference point on the wafer 200 that was previously provided by the now covered up alignment target 160.

In step 242, a photoresist may be spin coated over the thermal oxide layer 155a of the bottom surface 145a and soft baked. This photoresist layer may protect the underside of the wafer 150.

In step 244, the exposed portions of the thermal oxide layer 255 may be etched away using the solution of BOE.

In step 246, the photoresist may be removed from both the top surface 240 and bottom surface 145. A hot organic photoresist stripper may be used containing a solution of N-Methylpyrrolidone (NMP) at 100° C. The result of stripping away the photoresist may provide a thermal oxide pattern for the opening exposing the probe tip mold 110a and the alignment target 260.

In step 248, the bonded wafer pair 105, and more particularly, the exposed portions of the wafer 200 may be etched out using an anisotropic etch solution along a patterned oxide mask. For example, using a solution of 30% weight KOH at 85° C. the etching process may proceed for approximately 800 minutes where exposed portions of the wafer 200 may be removed until the etching process stops when the etching solution reaches a bonding oxide layer (e.g. the thermal oxide layer 155a on the top surface 140). It will be understood that exposed portions of the top surface 140 may now be considered part of the top side 107.

Using photolithography, a probe handle support 120a may be formed from the second wafer 200 by etching which exposes openings 205a along a pattern in the oxide mask. Sloped sidewalls 212 may be formed during the etching process defining the perimeter of the handle support 120a. The back of the handle support 120a may be defined by opening 205a separating the probe tip pattern 100a from the remainder of the patterns 100a on the wafer pair 105. The sidewalls 212 are shown in broken form to illustrate that the distance from the top surface 140 to the thermal oxide layer 255 is not necessarily to scale. While the handle pattern shown is generally rectangular, it will be understood that the handle support 120a may be patterned in other shapes according to design preferences, for example, to fit an interface with a mounting structure the probe may be attached to.

The photolithography process may also expose the probe tip mold 110a on the wafer 150. In some embodiments, the third alignment target 260 aligned with the first and second alignment targets 160; 162 may be etched into the second wafer 200.

Figure 11:
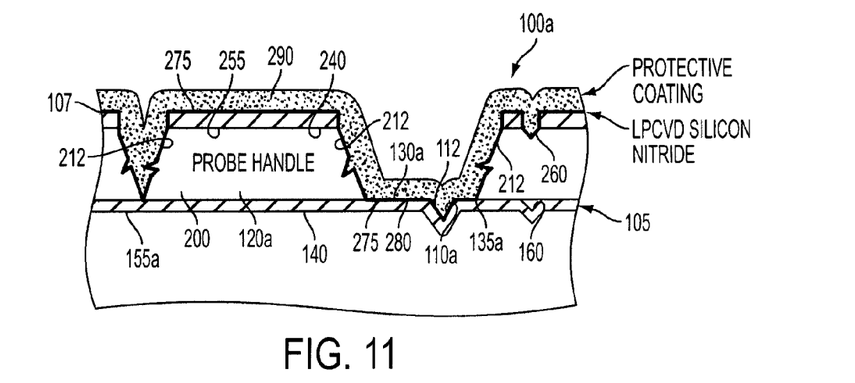
FIG. 11 is a cross-sectional side view of a thin film deposition applied to exposed top surfaces bonded wafers.

Referring to FIG. 11, in step 250, a thin film layer 275 may be deposited onto the exposed portions on both the top side 107 and bottom side 109 (FIG. 9). For example, on the top side 107 the thin film layer 275 may cover the thermal oxide layer 255 on the probe handle support 120a, the exposed portion 280 of the thermal oxide layer 155a between the handle support 120a, the sidewalls 212, and the sidewalls 112 of the probe tip mold 110a. For sake of illustration, the deposition of the thin film layer 275 on the bottom side 109 covering the thermal oxide layer 155a of the bottom surface 145 has been omitted because this material will be removed.

The thin film layer 275 may form a rigid substrate providing the structure for the resulting probe 100 (FIG. 1) which includes the probe handle 120 (FIG. 1), the cantilever 130 (FIG. 1) extending from the handle 120, and the probe tip 110 (FIG. 1). The material of the thin film layer 275 may depend on the application. For example, if an insulator material is desired, then the thin film layer 275 may comprise silicon nitride, aluminum oxide, boron carbide, boron nitride, or a polyimide (polymer). If a semi-conductor is needed, then the thin film layer 275 may be polysilicon, silicon carbide, diamond or diamond like carbon (DLC). If the application calls for a resistor or conductor probe tip then the thin film layer 275 may be tantalum nitride, titanium nitride, titanium silicide, tantalum silicide, tungsten silicide, or gold. For magnetic applications, the thin film layer 275 may use a magnetic material, for example platinum cobalt (PtCo) or Nickel Iron (NiFe). The thin film layer 275 may be deposited by employing a low pressure chemical vapor deposition (LPCVD) technique. The deposition of an LPCVD silicon nitride layer for example, may be conformal and uniform along the exposed top surfaces 140; 240, the sidewalls 112, and the sidewalls 212. An exemplary thickness of the thin film layer 275 may be about 0.2 um to 1.0 um depending on the design and specification of probing application.

In step 252, a protective coating 290 may be applied to the thin film layer 275 on the top side 107. The protective coating 290 may be a low stress organic material such as ProTEK® from Brewer Sciences, Inc. The protective coating 290 may be applied by spray-on techniques or by spin coating. An exemplary thickness of the protective coating 290 may be approximately 20 um. The protective coating 290 may be cured at approximately 200° C.

In step 254, the thin film layer 275 may be etched away from the bottom side 109 using for example, a dry plasma etcher comprising a mixture of gaseous Tetrafluoromethane ($CF_4$) and approximately 10% Oxygen ($O_2$).

In step 256 the thermal oxide layer 155a from the bottom side 109 may be etched away using the solution of BOE. It may be appreciated that the protective coating 290 protects the top side 107 during the removal of the thin film layer 275 and the thermal oxide 155a from the bottom side 109.

In step 258, the first wafer 150 may then be etched away using a 30% weight solution of KOH at 85° C. for approximately 800 minutes until the etching process stops when it reaches the thermal oxide layer 155a on the top surface 140. It will be understood that the bottom side 109 may now be considered the outward facing side of the thermal oxide layer 155a at the top surface 140.

In step 260, a photoresist may be spin coated onto the bottom side 109 and soft baked.

In step 262, a mask aligned to the alignment target 262 may be applied to the bottom side 109. The mask may provide a pattern covering the thermal oxide layer 155a under the probe handle support 120a. The wafer pair 105 may be subjected to developer to remove the photoresist surrounding the pattern covering the thermal oxide layer 155a under the probe handle support 120a.

In step 264, the exposed portions of the thermal oxide layer 155a may be etched away using the solution of BOE. It will be understood that the bottom side 109 now includes the thermal oxide layer 155a under the probe handle support 120a, the exposed portions of the thin film layer 275 which include the portion 280, and the probe tip mold 110a.

In step 266, the remaining photoresist may be removed by dry etching in oxygen plasma.

In step 268, a photoresist may be spin coated to the bottom side 109 covering the exposed thin film layer 275 and the thermal oxide layer 155a under the probe handle support 120a.

In step 270, a mask aligned to the alignment target 260 may be applied over the photoresist covering a cantilever substrate section 130a. The cantilever substrate 130a may be defined as the section of the thin film layer 275 extending from the sidewall 212 of the probe handle support 120a to an "edge" point 135a on an opposite side of the probe tip mold 110a. In some embodiments, the "edge" point 135a may be positioned beyond the probe tip mold 110a. The photoresist may be developed providing a photoresist pattern of the cantilever 130 (FIG. 1) in the thin film layer 275.

In step 272, the thin film layer 275 left exposed by the photoresist pattern may be etched away using a plasma etcher comprising a mixture of gaseous Tetrafluoromethane ($CF_4$) and approximately 10% Oxygen ($O_2$). The remaining section of thin film layer 275 includes the cantilever substrate section 130a.

In step 274, the wafer 200 may be mounted into a fixture.

Figure 12:
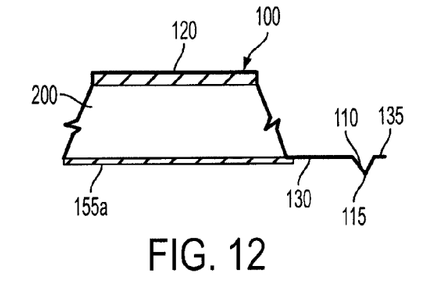
FIG. 12 is a cross-sectional side view of the resultant thin film probe of FIG. 1 provided by etching the bonded wafers of FIG. 11.

In step 276, the wafer 200 may be immersed in a hot organic stripper and cleaner solution containing for example, N-Methylpyrrolidone (NMP) at 100° C. The remaining photoresist and the protective coating 290 may be removed thus exposing the cantilever 130 and the probe tip 110 as features of the remaining thin film layer 275. It may be appreciated that by using a rigid material for the thin film layer 275 that issues germane to over flexing and vibration may be controlled. Moreover that by using a hollow probe tip mold 110a to form the probe tip 110, the acuteness of the probe tip 110 may be controlled when depositing the thin film layer 275.

Figure 13:
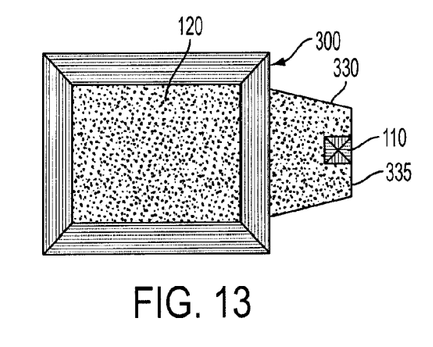
FIG. 13 is a top view of a thin film probe with a probe tip formed at a cantilever edge in accordance with another exemplary embodiment of the present invention.
Figure 14:
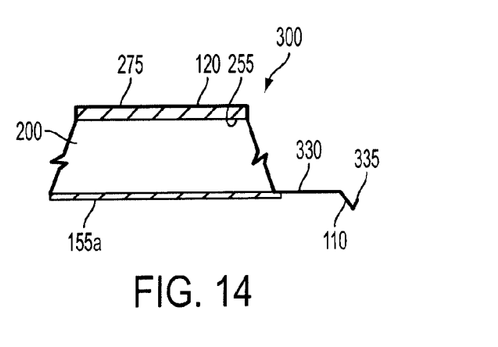
FIG. 14 is a cross-sectional side view of the thin film probe of FIG. 13.

Referring now to FIGS. 13 and 14, an alternative embodiment of a probe 300 is shown. The probe 300 is similar to the probe 100 except that a cantilever 300 may be formed so that the probe tip 110 is positioned at a distal edge 335. This may be accomplished by setting the "edge" point 135a (FIG. 11) at an edge of the probe tip mold 110a (FIG. 11). Embodiments with the probe tip 110 at the cantilever edge 335 may provide better visibility of the probe tip 110 with respect to the end of cantilever 330 during use.

It should be understood, of course, that the foregoing relates to exemplary embodiments of the invention and that modifications may be made without departing from the spirit and scope of the invention as set forth in the following claims.

I claim:

1. A method of producing a thin film probe for atomic force microscopy, comprising:
   etching a probe tip mold into a first wafer;
   bonding a second wafer over the first wafer while concealing the probe tip mold;
   etching away a portion of the second wafer exposing the probe tip mold;
   depositing a layer of thin film onto the second wafer and into the exposed probe tip mold, the thin film forming a substrate defining the probe to include a handle on the second wafer, a cantilever extending from the handle, and a probe tip;
   removing the first wafer;
   removing the thin film layer in a pattern leaving the substrate defining the probe intact; and
   removing the substrate defining the probe from a remainder of the second wafer.

2. The method of claim 1, wherein the probe tip is a hollow depression in the cantilever.

3. The method of claim 1, wherein the probe tip is formed in an inverted pyramid shape.

4. The method of claim 1, wherein the thin film is rigid.

5. The method of claim 1, wherein probe tip is formed at an edge of the cantilever.

6. The method of claim 1, including:
   growing a thermal oxide layer along sidewalls of the etched probe tip mold; and
   controlling the thickness of the thermal oxide layer to define an acute angle at a nadir of the probe tip mold.

* * * * *